US012682794B2

(12) United States Patent
Hong

(10) Patent No.: US 12,682,794 B2
(45) Date of Patent: Jul. 14, 2026

(54) ARITHMETIC PROCESSING DEVICE, IMAGING DEVICE AND HEAD MOUNTED SYSTEM

(71) Applicant: ASUSTek COMPUTER INC., Taipei City (TW)

(72) Inventor: Jyun-Miao Hong, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 0 days.

(21) Appl. No.: 18/922,287

(22) Filed: Oct. 21, 2024

(65) Prior Publication Data

US 2026/0065815 A1 Mar. 5, 2026

(30) Foreign Application Priority Data

Aug. 29, 2024 (TW) ................................ 113132628

(51) Int. Cl.
| | |
|---|---|
| *G09G 3/00* | (2006.01) |
| *G06F 17/18* | (2006.01) |
| *H04N 7/04* | (2006.01) |
| *H04B 17/11* | (2015.01) |

(52) U.S. Cl.
CPC ............. *G09G 3/001* (2013.01); *G06F 17/18* (2013.01); *G09G 3/006* (2013.01); *H04N 7/04* (2013.01); *G09G 2330/12* (2013.01); *G09G 2370/16* (2013.01); *H04B 17/11* (2015.01)

(58) Field of Classification Search
CPC .... G09G 3/001; G09G 3/006; G09G 2330/12; G09G 2370/16; G06F 17/18; H04N 7/04; H04B 17/11
See application file for complete search history.

(56) References Cited

U.S. PATENT DOCUMENTS

| | | | |
|---|---|---|---|
| 12,106,688 B1 * | 10/2024 | Ebner ..................... | G06F 3/013 |
| 2015/0319108 A1 | 11/2015 | Maung et al. | |
| 2023/0035428 A1 * | 2/2023 | Chou ........................ | G06F 1/26 |
| 2023/0246888 A1 * | 8/2023 | Wu ................... | H04L 25/03878 |
| | | | 375/230 |

FOREIGN PATENT DOCUMENTS

| | | |
|---|---|---|
| CN | 107484424 | 12/2017 |
| TW | 202220396 | 5/2022 |
| TW | M643746 | 7/2023 |

* cited by examiner

*Primary Examiner* — Hang Lin
(74) *Attorney, Agent, or Firm* — JCIPRNET

(57) ABSTRACT

An arithmetic processing device, an imaging device, and a head mounted system are provided. The arithmetic processing device includes a first circuit board, a processor, and a first re-driving circuit. The first circuit board has a first transmission interface. The processor is installed on the first circuit board and configured to evaluate transmission quality of a transmission signal transmitted through the first transmission interface. The first re-driving circuit is installed on the first circuit board and coupled between the processor and the first transmission interface. The processor transmits a first control signal to the first re-driving circuit according to the evaluated transmission quality of the transmission signal to control the first re-driving circuit to re-drive the transmission signal.

14 Claims, 6 Drawing Sheets

100

ARITHMETIC PROCESSING DEVICE, IMAGING DEVICE AND HEAD MOUNTED SYSTEM

CROSS-REFERENCE TO RELATED APPLICATION

This application claims the priority benefit of Taiwan application serial no. 113132628, filed on Aug. 29, 2024. The entirety of the above-mentioned patent application is hereby incorporated by reference herein and made a part of this specification.

BACKGROUND

Technical Field

The disclosure relates to an arithmetic processing device, an imaging device, and a head mounted system adapted to provide users with an improved user experience.

Description of Related Art

Along with rapid development of science and technology, people's ways of absorbing information are also increasing day by day. In order to balance the requirements of visual effects and portability, head mounted displays (HMDs) have been launched in the market. However, in the HMDs on the market, various components such as motherboards, batteries, screens, processors, etc., are combined together on the same hardware structure. As a result, the weight placed on the user's head is excessively heavy, making it difficult for the user to use the HMD for a long time, causing pain in the user's shoulders and neck, which in turn affects the user experiences.

SUMMARY

The disclosure provides an arithmetic processing device including a first circuit board, a processor, and a first re-driving circuit. The first circuit board has a first transmission interface. The processor is installed on the first circuit board and configured to evaluate transmission quality of a transmission signal transmitted through the first transmission interface. The first re-driving circuit is installed on the first circuit board and coupled between the processor and the first transmission interface. The processor transmits a first control signal to the first re-driving circuit according to the evaluated transmission quality of the transmission signal to control the first re-driving circuit to re-drive the transmission signal.

The disclosure further provides an imaging device, which includes an image display device, an image capturing device, a second circuit board, a controller, and a second re-driving circuit. The second circuit board has a second transmission interface. The controller is installed on the second circuit board and coupled to the image display device and the image capturing device, and is configured to evaluate transmission quality of a transmission signal transmitted through the second transmission interface. The second re-driving circuit is installed on the second circuit board and coupled between the controller and the second transmission interface. The controller transmits a second control signal to the second re-driving circuit according to the evaluated transmission quality of the transmission signal to control the second re-driving circuit to re-drive the transmission signal.

The disclosure further provides a head mounted system, which includes an arithmetic processing device and an imaging device. The arithmetic processing device includes a first circuit board, a processor, and a first re-driving circuit. The first circuit board has a first transmission interface. The processor is installed on the first circuit board and configured to evaluate transmission quality of a transmission signal transmitted through the first transmission interface. The first re-driving circuit is installed on the first circuit board and coupled between the processor and the first transmission interface. The imaging device includes an image display device, an image capturing device, a second circuit board, a controller and a second re-driving circuit. The second circuit board has a second transmission interface. The second transmission interface and the first transmission interface are detachably connected to each other through a cable. The controller is installed on the second circuit board and coupled to the image display device and the image capturing device, and is configured to evaluate transmission quality of a transmission signal transmitted through the second transmission interface. The second re-driving circuit is installed on the second circuit board and coupled between the controller and the second transmission interface. The processor and the controller evaluate transmission quality of a transmission signal transmitted through the first transmission interface and the second transmission interface together, so as to respectively control the first re-driving circuit and the second re-driving circuit to re-drive the transmission signal.

Based on the above descriptions, the arithmetic processing device, the imaging device, and the head mounted system of the disclosure are adapted to independently configure various components required for the head mounted display on different hardware structures. In this way, these components are no longer limited to be configured in the head mounted structure. The weight originally added to the user's head is thereby reduced, the use time is extended, shoulder and neck pain is avoided, and the user is thus provided with improved user experiences.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
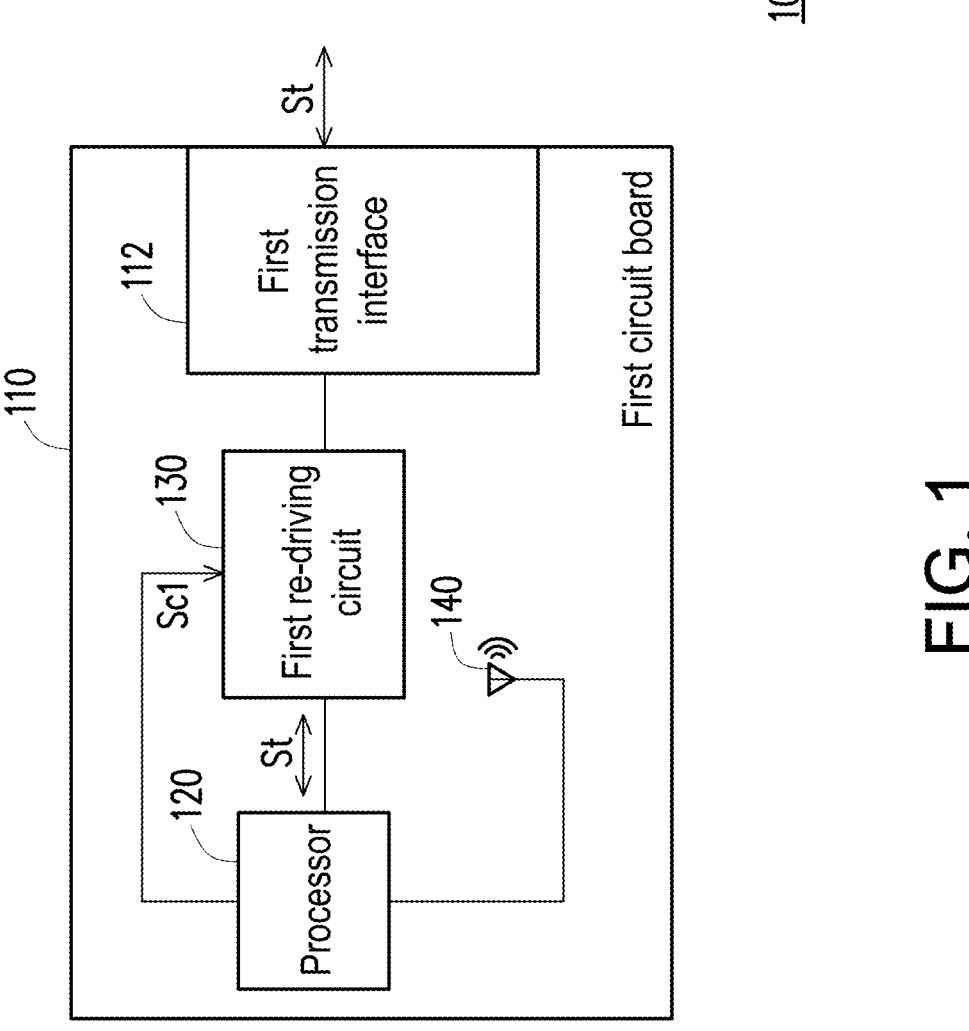
FIG. 1 is a block schematic diagram of an arithmetic processing device according to an embodiment of the disclosure.

Referring to FIG. 1, an arithmetic processing device 100 of the embodiment includes a first circuit board 110, a processor 120, a first re-driving circuit 130, and a first wireless transmission device 140. The first circuit board 110 is implemented by, for example, a printed circuit board (PCB). The first circuit board 110 has a first transmission interface 112, which may implement signal transmission with external devices through connected cables.

The processor 120 is, for example, a central processing unit (CPU), or other programmable general-purpose or special-purpose microprocessor, digital signal processor (DSP), programmable controller, application specific integrated circuit (ASIC) or other similar components or a combination of the above components. The processor 120 is installed on the first circuit board 110 and may evaluate transmission quality of a transmission signal St transmitted (including output or received) through the first transmission interface 112.

The first re-driving circuit 130 is installed on the first circuit board 110 and coupled between the processor 120 and the first transmission interface 112.

The first wireless transmission device 140 is also installed on the first circuit board 110 and coupled to the processor 120. The first wireless transmission device 140 may, for example, use the infrared data association (IrDA) standard, the Internet (including cloud services), Bluetooth communication, near field communication (NFC) or wireless fidelity (WiFi) communication, etc., to implement wireless transmission with wireless transmission devices in the external devices.

In the embodiment, the processor 120 may transmit a first control signal Sc1 to the first re-driving circuit 130 according to the evaluated transmission quality of the transmission signal St to control the first re-driving circuit 130 to re-drive the transmission signal St. For example, when the first control signal Sc1 is at a first logic level (for example, a high logic level), the first re-driving circuit 130 re-drives the transmission signal St. When the first control signal Sc1 is at a second logic level (for example, a low logic level), the first re-driving circuit 130 does not re-drive the transmission signal St.

Furthermore, the transmission quality of the transmission signal St includes a transmission signal amount of the transmission signal St. The processor 120 may evaluate the transmission signal amount of the transmission signal St output to or received from the outside through the first transmission interface 112. When the processor 120 evaluates that the transmission signal amount of the transmission signal St is lower than a first threshold percentage (for example, about 60%), it means that the transmission signal St may attenuate too much after being transmitted and a waveform thereof becomes incomplete. At this time, the processor 120 may transmit the first control signal Sc1 of the first logic level to the first re-driving circuit 130 to control the first re-driving circuit 130 to re-drive the transmission signal St. In this way, the first re-driving circuit 130 may reshape the transmission signal St, which not only increases a gain, but also restores the waveform.

On the other hand, when the processor 120 evaluates that the transmission signal amount of the transmission signal St is above the first threshold percentage, it means that the current transmission signal St still meets a transmission standard. At this time, the processor 120 may transmit the first control signal Sc1 of the second logic level to the first re-driving circuit 130, and the first re-driving circuit 130 does not re-drive the transmission signal St.

In addition, when the transmission signal amount of the re-driven transmission signal St is lower than a second threshold percentage (for example, about 10%), it means that the cable connected to the first transmission interface 112 may be knotted or disconnected, not connected properly or damaged. At this time, the processor 120 may switch to transmitting the transmission signal St in a wireless transmission manner through the first wireless transmission device 140 to avoid transmission interruption.

Figure 2:
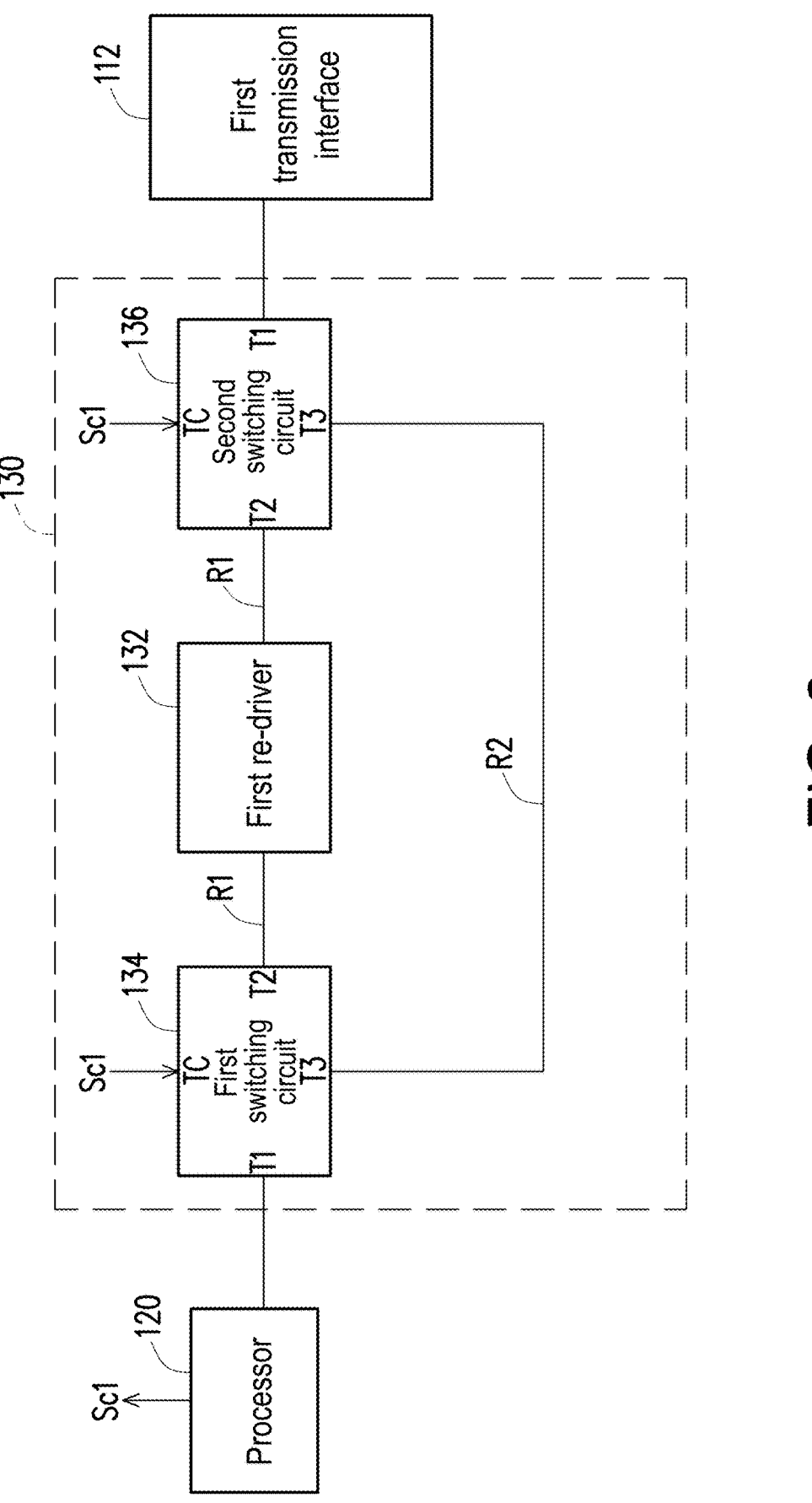
FIG. 2 is a circuit schematic diagram of a first re-driving circuit according to an embodiment of the disclosure.

The following is an example to illustrate implementation details of the first re-driving circuit 130, referring to FIG. 2, the first re-driving circuit 130 includes a first transmission path R1, a second transmission path R2, a first re-driver 132, a first switching circuit 134 and a second switching circuit 136.

The first re-driver 132 is located on the first transmission path R1 and may re-drive the transmission signal St transmitted on the first transmission path R1.

The first switching circuit 134 is coupled to the processor 120, one end of the first transmission path R1 and one end of the second transmission path R2. The first switching circuit 134 may be controlled by the first control signal Sc1 to switch the processor 120 between being coupled to the first transmission path R1 and being coupled to the second transmission path R2.

The second switching circuit 136 is coupled to the first transmission interface 112, another end of the first transmission path R1 and another end of the second transmission path R2, and the second switching circuit 136 may be controlled by the first control signal Sc1 to switch the first transmission interface 112 between being coupled to the first transmission path R1 and being coupled to the second transmission path R2.

In the embodiment, the processor 120 first uses the first control signal Sc1 of the second logic level to control the first switching circuit 134 and the second switching circuit 136 to transmit the transmission signal St through the second transmission path R2, so that the transmission signal St directly passes through the first re-driving circuit 130. When the processor 120 evaluates that the transmission signal amount of the transmission signal St is lower than the first threshold percentage when the transmission signal St is transmitted through the second transmission path R2, the processor 120 may use the first control signal Sc1 of the first logic level to control the first switching circuit 134 and the second switching circuit 136 to switch to transmitting the transmission signal St through the first transmission path R1, so that the first re-driver 132 located on the first transmission path R1 re-drives the transmission signal St.

In detail, the first switching circuit 134 and the second switching circuit 136 each have a first path terminal T1, a second path terminal T2, a third path terminal T3 and a switching control terminal TC. As shown in FIG. 2, the first path terminal T1 of the first switching circuit 134 is coupled to the processor 120, the second path terminal T2 of the first switching circuit 134 is coupled to one end of the first transmission path R1, and the third path terminal T3 of the first switching circuit 134 is coupled to one end of the second transmission path R2. The first path terminal T1 of the second switching circuit 136 is coupled to the first transmission interface 112, the second path terminal T2 of the second switching circuit 136 is coupled to the other end of the first transmission path R1, and the third path terminal T3 of the second switching circuit 136 is coupled to the other end of the second transmission path R2. The switching control terminals TC of the first switching circuit 134 and the second switching circuit 136 receive the first control signal Sc1.

When the first control signal Sc1 is at the first logic level, each of the first switching circuit 134 and the second switching circuit 136 switches the first path terminal T1 thereof to be coupled to the corresponding second path terminal T2. In this way, the transmission signal St may be transmitted through the first transmission path R1 in the first re-driving circuit 130, and meanwhile the transmission signal St may be re-driven through the first re-driver 132, thereby maintaining good transmission quality.

When the first control signal Sc1 is at the second logic level, each of the first switching circuit 134 and the second switching circuit 136 switches the first path terminal T1 thereof to be coupled to the corresponding third path terminal T3. In this way, the transmission signal St may be transmitted through the second transmission path R2 in the first re-driving circuit 130 without being re-driven.

Figure 3:
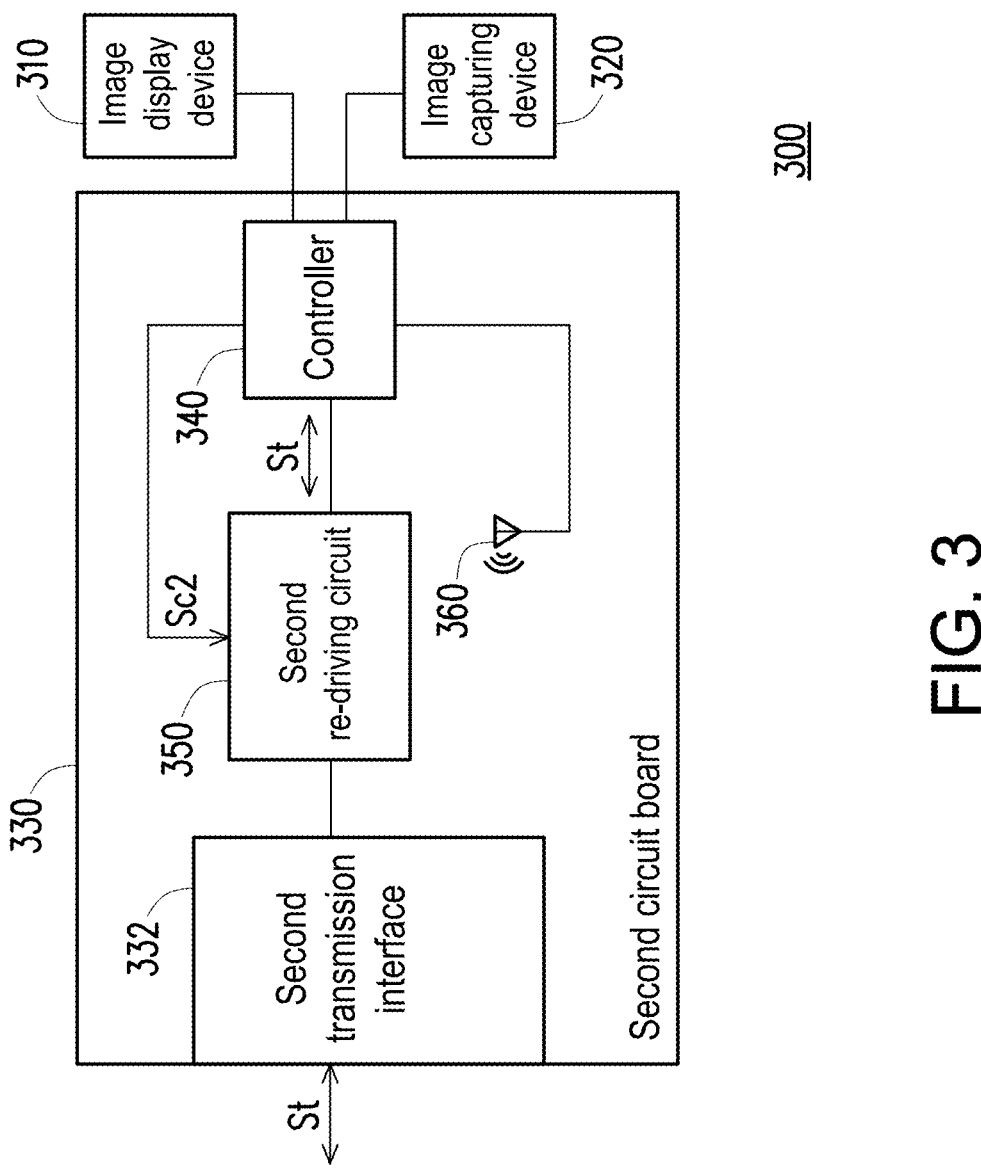
FIG. 3 is a block schematic diagram of an imaging device according to an embodiment of the disclosure.

Referring to FIG. 3, the imaging device 300 of the embodiment includes an image display device 310, an image capturing device 320, a second circuit board 330, a controller 340, a second re-driving circuit 350, and a second wireless transmission device 360.

The image display device 310 is, for example, a display using a liquid crystal display (LCD), a light-emitting diode (LED), a field emission display (FED), or other types of panels. The image display device 310 may display images according to the transmission signal St received by the imaging device 300 from the outside.

The image capturing device 320 is, for example, a device including an optical fixed-focus lens or an optical zoom lens, and a photosensitive element such as a charge coupled device (CCD) or a complementary metal-oxide semiconductor (CMOS), etc. An image captured by the image capturing device 320 may be converted into the transmission signal St and output to the outside.

The second circuit board 330 is, for example, also implemented by a printed circuit board. The second circuit board 330 has a second transmission interface 332, which may implement signal transmission with external devices through a connected cable. Compared with the first circuit board 110 in the above embodiment, the second circuit board 330 has a smaller area and scale, and has fewer components installed thereon.

The controller 340 is, for example, a programmable chip such as a microcontroller. The controller 340 is installed on the second circuit board 330 and coupled to the image display device 310 and the image capturing device 320. The controller 340 may evaluate the transmission quality of the transmission signal St transmitted (including output or received) through the second transmission interface 332.

The second re-driving circuit 350 is installed on second circuit board 330 and coupled between the controller 340 and the second transmission interface 332.

The second wireless transmission device 360 is also installed on the second circuit board 330 and coupled to the controller 340. The second wireless transmission device 360 may perform wireless transmission with a wireless transmission device in an external device through, for example, Internet the infrared data association (IrDA) standard, the Internet (including cloud services), Bluetooth communication, near field communication (NFC) or wireless fidelity (WiFi) communication.

In the embodiment, the controller 340 may transmit a second control signal Sc2 to the second re-driving circuit 350 according to the evaluated transmission quality of the transmission signal St to control the second re-driving circuit 350 to re-drive the transmission signal St. For example, when the second control signal Sc2 is at the first logic level (for example, the high logic level), the second re-driving circuit 350 re-drives the transmission signal St. When the second control signal Sc2 is at the second logic level (for example, the low logic level), the second re-driving circuit 350 does not re-drive the transmission signal St.

Furthermore, the transmission quality of the transmission signal St includes a transmission signal amount of the transmission signal St. The controller 340 may evaluate the transmission signal amount of the transmission signal St output to or received from the outside through the second transmission interface 332. When the controller 340 evaluates that the transmission signal amount of the transmission signal St is lower than the first threshold percentage (for example, about 60%), it means that the transmission signal St may attenuate too much after being transmitted and the waveform thereof becomes incomplete. At this time, the controller 340 may transmit the second control signal Sc2 of the first logic level to the second re-driving circuit 350 to control the second re-driving circuit 350 to re-drive the transmission signal St. In this way, the second re-driving circuit 350 may reshape the transmission signal St, which not only increases the gain, but also restores the waveform.

On the other hand, when the controller 340 evaluates that the transmission signal amount of the transmission signal St is above the first threshold percentage, it means that the current transmission signal St still meets the transmission standard. At this time, the controller 340 may transmit the second control signal Sc2 of the second logic level to the second re-driving circuit 350, and the second re-driving circuit 350 does not re-drive the transmission signal St.

In addition, when the transmission signal amount of the re-driven transmission signal St is lower than the second threshold percentage (for example, about 10%), it means that the cable connected to the second transmission interface 332 may be knotted or disconnected, not connected properly or damaged. At this time, the controller 340 may switch to transmitting the transmission signal St in a wireless transmission manner through the second wireless transmission device 360 to avoid transmission interruption.

Figure 4:
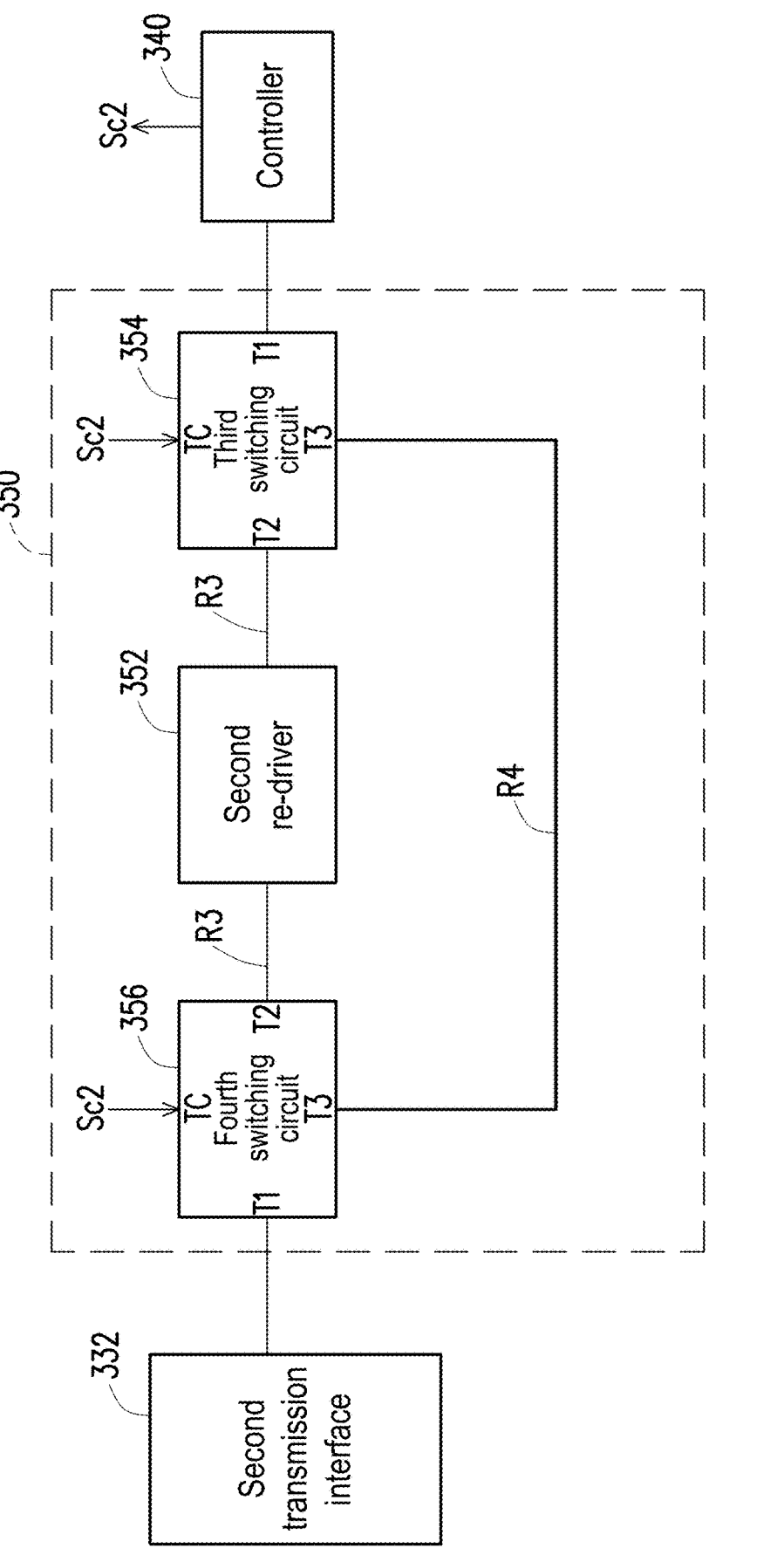
FIG. 4 is a circuit schematic diagram of a second re-driving circuit according to an embodiment of the disclosure.

The following is an example to illustrate implementation details of the second re-driving circuit 350, referring to FIG. 4, the second re-driving circuit 350 includes a third transmission path R3, a fourth transmission path R4, a second re-driver 352, a third switching circuit 354 and a fourth switching circuit 356.

The second re-driver 352 is located on the third transmission path R3 and may re-drive the transmission signal St transmitted on the third transmission path R3.

The third switching circuit 354 is coupled to the controller 340, one end of the third transmission path R3 and one end of the fourth transmission path R4. The third switching circuit 354 may be controlled by the second control signal Sc2 to switch the controller 340 between being coupled to the third transmission path R3 and being coupled to the fourth transmission path R4.

The fourth switching circuit 356 is coupled to the second transmission interface 332, another end of the third transmission path R3 and another end of the fourth transmission path R4, and the fourth switching circuit 356 may be controlled by the second control signal Sc2 to switch the second transmission interface 332 between being coupled to the third transmission path R3 and being coupled to the fourth transmission path R4.

In the embodiment, the controller 340 first uses the second control signal Sc2 of the second logic level to control the third switching circuit 354 and the fourth switching circuit 356 to transmit the transmission signal St through the fourth transmission path R4, so that the transmission signal St directly passes through the second re-driving circuit 350. When the controller 340 evaluates that the transmission signal amount of the transmission signal St is lower than the first threshold percentage when the transmission signal St is transmitted through the fourth transmission path R4, the controller 340 may use the second control signal Sc2 of the first logic level to control the third switching circuit 354 and the fourth switching circuit 356 to switch to transmitting the transmission signal St through the third transmission path R3, so that the second re-driver 352 located on the third transmission path R3 re-drives the transmission signal St.

In detail, the third switching circuit 354 and the fourth switching circuit 356 each have a first path terminal T1, a second path terminal T2, a third path terminal T3 and a switching control terminal TC. As shown in FIG. 4, the first path terminal T1 of the third switching circuit 354 is coupled to the controller 340, the second path terminal T2 of the third switching circuit 354 is coupled to one end of the third transmission path R3, and the third path terminal T3 of the third switching circuit 354 is coupled to one end of the fourth transmission path R4. The first path terminal T1 of the fourth switching circuit 356 is coupled to the second transmission interface 332, the second path terminal T2 of the fourth switching circuit 356 is coupled to the other end of the third transmission path R3, and the third path terminal T3 of the fourth switching circuit 356 is coupled to the other end of the fourth transmission path R4. The switching control terminals TC of the third switching circuit 354 and the fourth switching circuit 356 receive the second control signal Sc2.

When the second control signal Sc2 is at the first logic level, each of the third switching circuit 354 and the fourth switching circuit 356 switches the first path terminal T1 thereof to be coupled to the corresponding second path terminal T2. In this way, the transmission signal St may be transmitted through the third transmission path R3 in the second re-driving circuit 350, and meanwhile the transmission signal St may be re-driven through the second re-driver 352, thereby maintaining good transmission quality.

When the second control signal Sc2 is at the second logic level, each of the third switching circuit 354 and the fourth switching circuit 356 switches the first path terminal T1 thereof to be coupled to the corresponding third path terminal T3. In this way, the transmission signal St may be transmitted through the fourth transmission path R4 in the second re-driving circuit 350 without being re-driven.

Figure 5A:
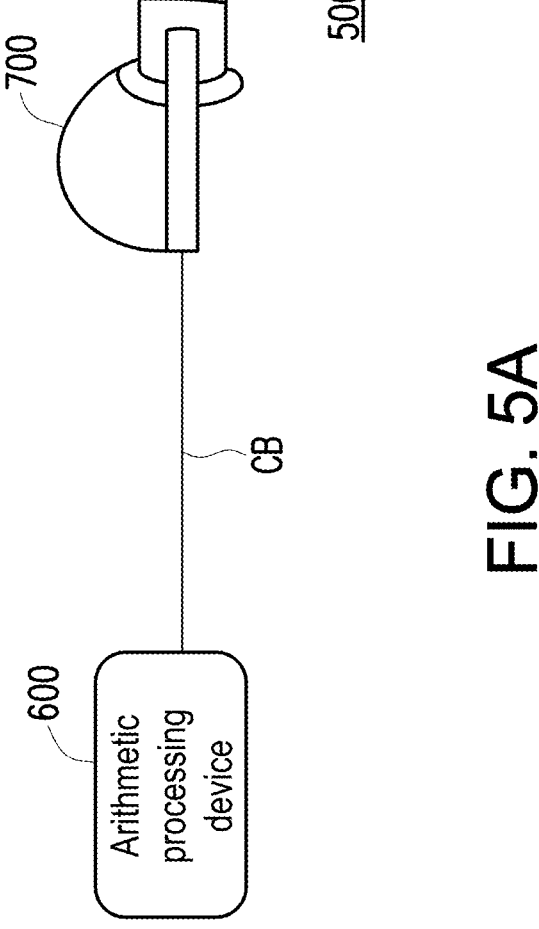
FIG. 5A is a product schematic diagram of a head mounted system according to an embodiment of the disclosure.
Figure 5B:
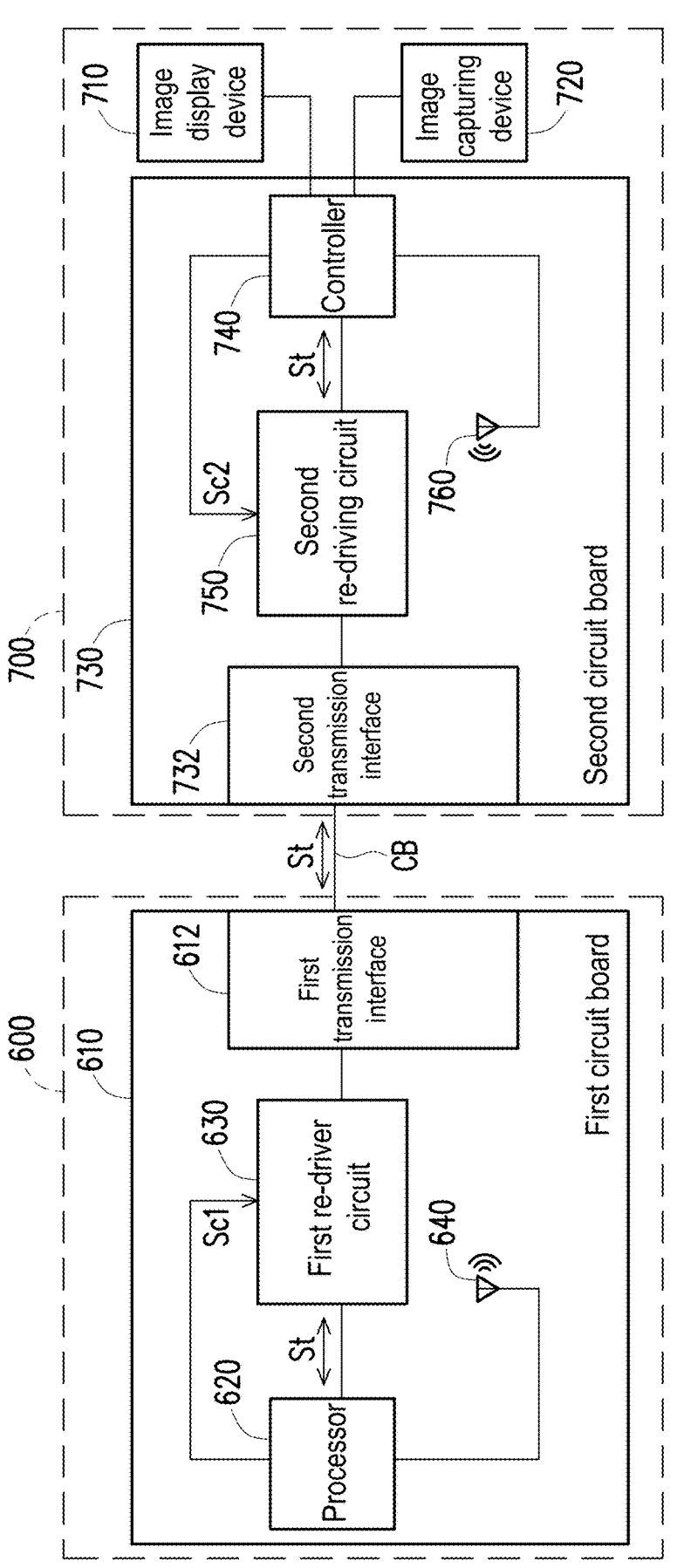
FIG. 5B is a block schematic diagram of the head mounted system according to an embodiment of the disclosure.

Referring to FIG. 5A and FIG. 5B together, a two-section head mounted system 500 of the embodiment includes an arithmetic processing device 600 and an imaging device 700. The arithmetic processing device 600 includes a first circuit board 610 with a first transmission interface 612, a processor 620, a first re-driving circuit 630 and a first wireless transmission device 640. The imaging device 700 includes an image display device 710, an image capturing device 720, a second circuit board 730 with a second transmission interface 732, a controller 740, a second re-driving circuit 750 and a second wireless transmission device 760. The arithmetic processing device 600 mainly serves as a signal and data processing center of the head mounted system 500, and an internal circuit thereof is relatively complex and may include heavy components such as a battery and a memory (such as a hard disk), which may be worn on other parts of the user's body other than the head, such as being carried on the back or strapped to the user's body. The imaging device 700 is mainly used for displaying and capturing images in front of the user's eyes, which may include various sensors, and has relatively simple internal circuit, and since it needs to be worn on the user's head during use, it should be as lightweight as possible.

The second transmission interface 732 in the imaging device 700 and the first transmission interface 612 in the arithmetic processing device 600 may be detachably connected to each other through a cable CB. The transmission signal St may be transmitted between the arithmetic processing device 600 and the imaging device 700 through the cable CB.

In the embodiment, the processor 620 in the arithmetic processing device 600 and the controller 740 in the imaging device 700 may complete evaluation of transmission quality of the transmission signal St transmitted through the first transmission interface 612 and the second transmission interface 732 together, so as to respectively control the first re-driving circuit 630 and the second re-driving circuit 750 to re-drive the transmission signal St. For example, when the transmission signal St is transmitted from the arithmetic processing device 600 to the imaging device 700, the controller 740 may evaluate a transmission signal amount of the received transmission signal St, and transmit relevant information of an evaluation result to the processor 620. Similarly, when the transmission signal St is transmitted from the imaging device 700 to the arithmetic processing device 600, the processor 620 may evaluate the transmission signal amount of the received transmission signal St, and transmit relevant information of the evaluation result to the controller 740.

When the evaluated transmission signal amount is lower than the first threshold percentage (for example, about 60%), it means that the transmission signal St may be attenuated too much after transmission and the waveform thereof becomes incomplete. At this time, the processor 620 may transmit the first control signal Sc1 of the first logic level to the first re-driving circuit 630, and the controller 740 may transmit the second control signal Sc2 of the first logic level to the second re-driving circuit 750, to respectively control the first re-driving circuit 630 and the second re-driving circuit 750 to re-drive the transmission signal St. In this way, the first re-driving circuit 630 and the second re-driving circuit 750 may reshape the transmission signal St, which not only increases the gain, but also restores the waveform, thereby maintaining good transmission quality.

In addition, when the transmission signal amount of the re-driven transmission signal St is lower than the second threshold percentage (for example, about 10%), it means that the cable CB may be knotted, disconnected, not connected properly or damaged. At this time, the processor 620 switches to transmitting the transmission signal St through the first wireless transmission device 640, and the controller 740 switches to transmitting the transmission signal St through the second wireless transmission device 760. In this way, the transmission signal St may be transmitted in a wireless transmission manner to avoid transmission interruption.

The coupling method, function and operation method of each component in the arithmetic processing device 600 and the imaging device 700 are respectively the same or similar as the coupling method, function and operation method of each component in the arithmetic processing device 100 and the imaging device 300 in the above embodiment, so that details thereof are not repeated.

In view of the foregoing, in the disclosure, through the arithmetic processing device, the imaging device, and the head mounted system, various components required for the head mounted display are independently configured on different hardware structures, and good transmission quality between the hardware structures are maintained. In this way, these components are no longer limited to be configured in the head mounted structure, so that the weight originally added to the user's head is reduced, the use time is extended, shoulder and neck pain is avoided, and the users is thus with improved user experiences.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An arithmetic processing device, comprising:
a first circuit board having a first transmission interface;
a processor installed on the first circuit board and configured to evaluate transmission quality of a transmission signal transmitted through the first transmission interface; and
a first re-driving circuit installed on the first circuit board and coupled between the processor and the first transmission interface,
wherein the processor transmits a first control signal to the first re-driving circuit according to the evaluated transmission quality of the transmission signal to control the first re-driving circuit to re-drive the transmission signal,
wherein when the first control signal is at a first logic level, the first re-driving circuit re-drives the transmission signal, and when the first control signal is at a second logic level, the first re-driving circuit does not re-drive the transmission signal.

2. The arithmetic processing device according to claim 1, wherein the first re-driving circuit comprises:
a first transmission path;
a second transmission path;
a first re-driver located on the first transmission path and configured to re-drive the transmission signal transmitted on the first transmission path;
a first switching circuit coupled to the processor, the first transmission path, and the second transmission path and configured to be controlled by the first control signal to switch the processor between being coupled to the first transmission path and being coupled to the second transmission path; and
a second switching circuit coupled to the first transmission interface, the first transmission path, and the second transmission path and configured to be controlled by the first control signal to switch the first transmission interface between being coupled to the first transmission path and being coupled to the second transmission path.

3. The arithmetic processing device according to claim 2, wherein the transmission quality comprises a transmission signal amount of the transmission signal, when the processor evaluates that the transmission signal amount of the transmission signal is lower than a first threshold percentage when the transmission signal is transmitted through the second transmission path, the processor uses the first control signal to control the first switching circuit and the second switching circuit to switch to transmitting the transmission signal through the first transmission path.

4. The arithmetic processing device according to claim 2, wherein each of the first switching circuit and the second switching circuit has a first path terminal, a second path terminal, a third path terminal, and a switching control terminal, the first path terminal of the first switching circuit is coupled to the processor, the second path terminal of the first switching circuit is coupled to one end of the first transmission path, the third path terminal of the first switching circuit is coupled to one end of the second transmission path, the first path terminal of the second switching circuit is coupled to the first transmission interface, the second path terminal of the second switching circuit is coupled to another end of the first transmission path, the third path terminal of the second switching circuit is coupled to another end of the second transmission path, and the switching control terminals of the first switching circuit and the second switching circuit receive the first control signal.

5. The arithmetic processing device according to claim 4, wherein when the first control signal is at the first logic level, each of the first switching circuit and the second switching circuit switches the first path terminal thereof to be coupled to the corresponding second path terminal, and when the first control signal is at the second logic level, each of the first switching circuit and the second switching circuit switches the first path terminal thereof to be coupled to the corresponding third path terminal.

6. The arithmetic processing device according to claim 1, wherein the transmission quality comprises a transmission signal amount of the transmission signal, and the arithmetic processing device further comprises:
a first wireless transmission device installed on the first circuit board and coupled to the processor,
wherein when the transmission signal amount of the re-driven transmission signal is lower than a second threshold percentage, the processor switches to transmit the transmission signal in a wireless transmission manner through the first wireless transmission device.

7. An imaging device, comprising:
an image display device;
an image capturing device;
a second circuit board having a second transmission interface;
a controller installed on the second circuit board and coupled to the image display device and the image capturing device and configured to evaluate transmission quality of a transmission signal transmitted through the second transmission interface; and
a second re-driving circuit installed on the second circuit board and coupled between the controller and the second transmission interface,
wherein the controller transmits a second control signal to the second re-driving circuit according to the evaluated transmission quality of the transmission signal to control the second re-driving circuit to re-drive the transmission signal,
wherein the second re-driving circuit comprises:
a third transmission path;
a fourth transmission path;
a second re-driver located on the third transmission path and configured to re-drive the transmission signal transmitted on the third transmission path;
a third switching circuit coupled to the controller, the third transmission path, and the fourth transmission path and configured to be controlled by the second control signal to switch the controller between being coupled to the third transmission path and being coupled to the fourth transmission path; and a fourth switching circuit coupled to the second transmission interface, the third transmission path, and the fourth transmission path and configured to be controlled by the second control signal to switch the second transmission interface between being coupled to the third transmission path and being coupled to the fourth transmission path.

8. The imaging device according to claim 7, wherein when the second control signal is at a first logic level, the second re-driving circuit re-drives the transmission signal, and when the second control signal is at a second logic level, the second re-driving circuit does not re-drive the transmission signal.

9. The imaging device according to claim 7, wherein the transmission quality comprises a transmission signal amount of the transmission signal, when the controller evaluates that the transmission signal amount of the transmission signal is lower than a first threshold percentage when the transmission signal is transmitted through the fourth transmission path, the controller uses the second control signal to control the third switching circuit and the fourth switching circuit to switch to transmitting the transmission signal through the third transmission path.

10. The imaging device according to claim 7, wherein each of the third switching circuit and the fourth switching circuit has a first path terminal, a second path terminal, a third path terminal, and a switching control terminal, the first path terminal of the third switching circuit is coupled to the controller, the second path terminal of the third switching circuit is coupled to one end of the third transmission path, the third path terminal of the third switching circuit is coupled to one end of the fourth transmission path, the first path terminal of the fourth switching circuit is coupled to the second transmission interface, the second path terminal of the fourth switching circuit is coupled to another end of the third transmission path, the third path terminal of the fourth switching circuit is coupled to another end of the fourth transmission path, and the switching control terminals of the third switching circuit and the fourth switching circuit receive the second control signal.

11. The imaging device according to claim 10, wherein when the second control signal is at a first logic level, each of the third switching circuit and the fourth switching circuit switches the first path terminal thereof to be coupled to the corresponding second path terminal, and when the second control signal is at a second logic level, each of the third switching circuit and the fourth switching circuit switches the first path terminal thereof to be coupled to the corresponding third path terminal.

12. The imaging device according to claim 7, wherein the transmission quality comprises a transmission signal amount of the transmission signal, and the imaging device further comprises:

a second wireless transmission device installed on the second circuit board and coupled to the controller, wherein when the transmission signal amount of the re-driven transmission signal is lower than a second threshold percentage, the controller switches to transmit the transmission signal in a wireless transmission manner through the second wireless transmission device.

13. A head mounted system, comprising:

an arithmetic processing device, comprising:

a first circuit board having a first transmission interface;

a processor installed on the first circuit board; and a first re-driving circuit installed on the first circuit board and coupled between the processor and the first transmission interface; and an imaging device, comprising:

an image display device and an image capturing device;

a second circuit board having a second transmission interface, wherein the second transmission interface and the first transmission interface are detachably connected to each other through a cable;

a controller installed on the second circuit board and coupled to the image display device and the image capturing device; and a second re-driving circuit installed on the second circuit board and coupled between the controller and the second transmission interface, wherein the processor and the controller evaluate transmission quality of a transmission signal transmitted through the first transmission interface and the second transmission interface together, so as to respectively control the first re-driving circuit and the second re-driving circuit to re-drive the transmission signal.

14. The head mounted system according to claim 13, wherein the transmission quality comprises a transmission signal amount of the transmission signal, and the arithmetic processing device further comprises:

a first wireless transmission device installed on the first circuit board and coupled to the processor, the imaging device further comprises:

a second wireless transmission device installed on the second circuit board and coupled to the controller, wherein when the transmission signal amount of the re-driven transmission signal is lower than a second threshold percentage, the processor switches to transmit the transmission signal through the first wireless transmission device, and the controller switches to transmit the transmission signal through the second wireless transmission device.

* * * * *